INVENTOR.
James R. Alburger

United States Patent Office 3,530,045
Patented Sept. 22, 1970

3,530,045
ELECTRICALLY RESPONSIVE COLOR-FORMING METHOD OF NONDESTRUCTIVE TESTING
James R. Alburger, 5007 Hillard Ave.,
La Canada, Calif. 91011
Filed Dec. 27, 1966, Ser. No. 604,869
Int. Cl. G01n 27/00; G01r 31/00
U.S. Cl. 204—1
5 Claims

ABSTRACT OF THE DISCLOSURE

A nondestructive testing method for detecting small surface or sub-surface defects in metallic parts, in which the test part is employed as a color-forming electrode immersed in a pH-sensitive "Electroflor" indicator liquid. When small sub-threshold electrical currents are passed between the test part electrode and an electrode of opposite polarity, color or fluorescence indications are formed on the surface of the test part. The color response exhibits variations in intensity depending on the presence of defects in the test part which may cause variations in current density at the color-forming electrode surface. Thus, the presence of defects is displayed by color patterns on the test surface.

---

This invention relates to a process of nondestructive testing. More particularly, the invention relates to a nondestructive testing process in which surface and subsurface defects in electrically conducting test bodies are indicated by means of an electrically responsive color-forming liquid.

Among the various presently known nondestructive test methods, such as radiography, eddy current testing, ultrasonic testing, and fluorescent penetrant inspection, for example, only the fluorescent penetrant inspection process is readily adaptable to high rates of production and low cost per unit part. Unfortunately, the penetrant inspection method is limited to the detection of surface flaws or discontinuities which have openings to the surface of the test parts.

Certain of the other presently known nondestructive test methods are capable of revealing the presence of subsurface defects in parts; however, for the most part the methods suffer from drawbacks in that they are excessively tedious and cumbersome, or they are overly expensive in use and not readily adaptable to high volume production in usage.

There are many requirements for the testing of items such as electronic circuits, structural parts, anodized surfaces, plated surfaces, sintered metal parts, and other electrically conductive parts, in which it is desired to detect either surface or subsurface defects, or both, and at high rates of production. Also, it is often required that the sensitivity of the flaw detection method shall be such that microscopic or submicroscopic defects may be detected.

The principal object of the invention, therefore, is to provide a nondestructive test method which is adaptable to the rapid detection of small surface and subsurface discontinuities on electrically conductive test bodies.

Another object of the invention is to provide a nondestructive test method which yields flaw indications on a test surface in the form of fluorescent or visible color patterns.

Still another object of the invention is to provide a nondestructive test method which is controllable in its sensitivity in the detection of surface and subsurface defects in test bodies.

Figure 1:
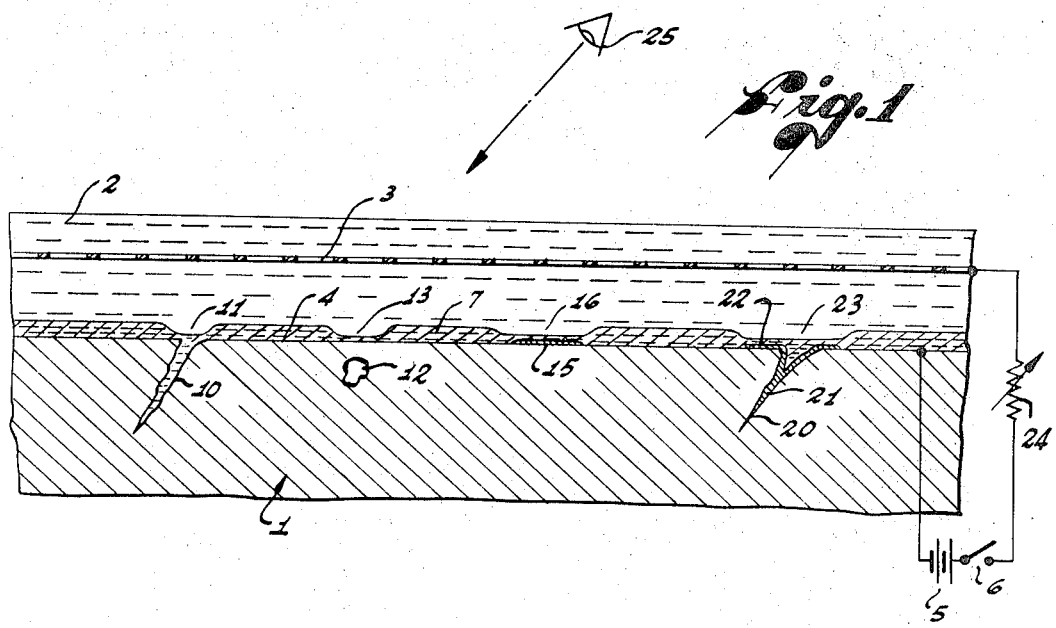
Figure 2:
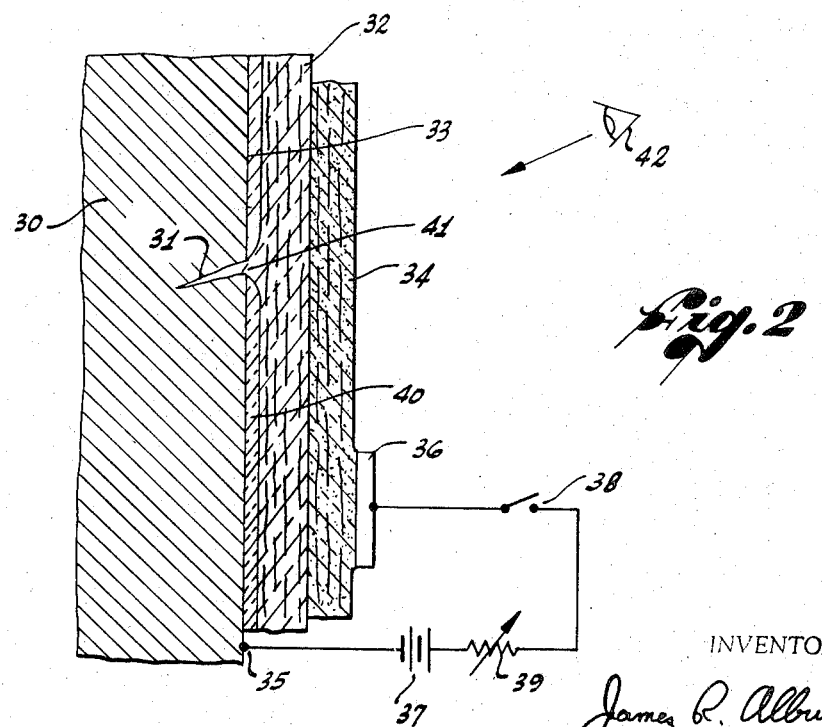

These and other objects of the invention will in part be obvious and will in part become apparent from the following description when read in conjunction with the accompanying drawings, in which:

FIG. 1 is a cross-sectional representation of the nondestructive test method of the invention, wherein test parts are immersed in an electrically responsive color-forming liquid; and FIG. 2 is a cross-sectional representation of the nondestructive test method of the invention, wherein an electrically responsive color-forming liquid is coated on a test surface in the form of a jelly-like layer.

For the purpose of this specification, an electrically responsive color-forming liquid is any liquid material which is capable of producing a color or color change on an electrode surface responsive to an electrolytic or subthreshold electrolytic current. There are various kinds of such liquids, and they may behave in different ways, but in all cases, they will provide results which are suitable for the purpose of this invention. For example, various solutions of metallic salts may be employed. When two electrodes are immersed in such a solution and a current is passed between the electrodes, a deposit of metal is plated out of the solution onto the cathodic electrode. If the metallic salt solution is one consisting of a solution of a material such as silver nitrate, then the electrolytic plating process results in a darkening of the cathode surface.

Another type of electrically responsive color-forming liquid is a solution of dimethyl glyoxime and salt. If the anodic electrode is composed of nickel, then the passage of an electric current will act to dissolve a small amount of nickel from this electrode. The thus-dissolved nickel immediately reacts with the dimethyl glyoxime to form an intense red coloration on the anode surface.

Still another type of electrically responsive color-forming liquid is a solution of a pH sensitive indicator dye containing just enough salt to provide electrical conductivity. If such a solution has its pH adjusted close to the point of color change of the indicator dye, then the passage of a subthreshold electrolytic current between electrodes immersed in the liquid may result in a color change on the surface of one of the electrodes. For example, a solution of thymolphthalein which has its pH value adjusted so as to be just below the point where a blue color is formed may be activated to provide a strong blue indication on the cathode surface by means of an extremely small "subthreshold" electrolytic current. By "subthreshold" is meant a current density which is below that required to produce an irreversible electrolytic dissociation in the liquid and the formation of gas bubbles.

The above-described pH sensitive liquids are known as Electroflor liquids, and they are described and claimed in my U.S. Pat. No. 3,123,806. A wide variety of pH sensitive dyes are available, and some are suitable for providing color indications on a cathodic electrode, while others are suitable for providing color indications on the anodic electrode. The dyes may exhibit a color change from colorless to a visible color, such as blue in the case of thymolphthalein, or red in the case of phenolphthalein. In other cases, color changes may occur as from amber to purple, or yellow to red, etc. In still other cases, a color change may occur from colorless to fluorescent blue or bluish white, as in the case of solutions of 1-naphthol-4-sulfonic acid or quinine sulfate, respectively.

Where fluorescent Electroflor liquids are employed, the fluorescent response which occurs at an electrode surface must be observed in subdued ambient light and under ultraviolet irradiation. For the purpose of this specification the terms "color" and "colorforming" include fluorescence response along with visible color response.

I have discovered that when an electrically conducting test body containing some sort of surface or subsurface discontinuity is immersed in an electrically responsive color-forming liquid, and is connected as an electrode, the passage of an electric current into the electrode surface will produce a color zone on the surface which exhibits variations in color density or brightness, depending on the nature of the discontinuity. In general, the density of color which is formed on the surface of the test body is a function of current density and duration of the current flow, so that any discontinuity, such as a crack, an alteration in the crystalline makeup of the surface, or even a subsurface cavity or inclusion, will act to cause a localized variation in current density. This effect of color variation is illustrated in FIG. 1, which is a representation in cross-section of a test body containing different kinds of discontinuities.

Referring, now, to FIG. 1, an electrically conductive test body is immersed in an electrically responsive color-forming liquid 2. A fine wire grid 3 is also immersed in the liquid 2 and is positioned above the surface 4 of the test body 1. A battery 5, or equivalent voltage source, is connected through a switch 6 to the grid and the test part so as to provide proper polarity for color formation on the surface 4. When the switch 6 is closed momentarily, a color zone 7 is formed on the surface 4 of the test body. The thickness of this color zone, and, therefore, its color density or brightness, depends on the duration of the current pulse and the applied voltage.

Various kinds of dicontinuities are illustrated in the figure, along with illustrations as to the effect of the discontinuities on color zone formation. For example, a surface crack 10 disturbs the uniformity of current distribution over the surface 4, with the result that a relatively thin region in the color zone appears at point 11 around the surface crack.

A small cavity or blowhole 12 beneath the surface 4 also produces a disturbance in the uniformity of current density, with the result that a thin color zone is produced at point 13 directly over the subsurface discontinuity. The presence of a subsurface inclusion in place of the cavity at point 12 will produce similar results.

The presence of a surface contaminant, such as a thin layer of resinous residue or oily material, as shown at point 15, will act to interfere with the current distribution into the surface 4, and will thus cause a relatively thin color zone to be produced, as shown at point 16.

One useful procedure for detecting submicroscopic surface defects is to utilize an oily liquid as a penetrant to form oily entrapments in the surface defects. After the surface of the thus-treated test body is cleaned so as to remove surface oil, the part is dried. At this point, microscopic amounts of oil will migrate out of the surface defects to form thin films of oil around the defects. When the test body is then immersed in an electrically responsive color-forming liquid, and an appropriate electric current applied, the residue oil film will act to provide a sharp color contrast on the test surface.

Any conventional inspection penetrant material may be used to produce localized films around microscopic surface discontinuities, as described above. It is preferable, however, to use a penetrant liquid which does not dissolve readily in the electrically responsive color-forming liquid. This will minimize the degree of contamination of the electrically responsive color-forming liquid by dissolved penetrant entrapments.

Referring once again to FIG. 1, a surface defect 20 is shown in which an entrapment of penetrant liquid 21 has exuded to form a thin film of residue liquid 22 around the defect. The presence of this residue film causes a localized reduction in current flow into the surface 4, and, hence, a relatively thin color zone is produced at point 23. Under appropriate conditions, and with care in handling the process materials, it is possible to reveal the presence of residue films which are only a few molecules thick. Hence, the dimensional sensitivity to about 40 millimicrons. By this is meant that the highest sensitivity capability of presently known inspection penetrants is such that exuded films of penetrant liquid (from defects) must have thicknesses greater than about 40 millimicrons in order to exhibit a fluorescence or color response.

The use of the above-described electrically responsive color-forming liquids in accordance with the method described may be helpful in evaluating many kinds of test parts and test surfaces for surface or subsurface defects, or for surface features which may not be defects at all. For example, different metals or alloy materials may have different electrochemical potentials. Hence, side-by-side tests with such different materials, as a common electrode, may reveal distinctly different color response (at a given applied voltage and current duration).

When certain metal alloys are heat treated, the electrical conductivity and surface character of the material may be altered. It is, therefore, possible, under certain circumstances, to identify the condition of heat treat by means of the above-described method of color formation on a test surface.

Many other uses can be envisioned for electrically responsive color-forming liquids in nondestructive testing of test bodies for surface or subsurface discontinuities. For example, the character and uniformity of electroplated surfaces may be evaluated. Variations in thickness of anodic films may be detected. In the case of insulating layers of material, such as resinous coatings or nonmetallic layers, as, for example, molybdenum disilicide coatings over a molybdenum substrate, any porosity condition which extends down to the substrate may be revealed by a color-forming current flow.

As indicated above, this invention contemplates a method of nondestructive testing which involves various steps of immersing a test body as an electrode in an electrically responsive color-forming liquid, and applying an appropriate current to the test body electrode from a second electrode of opposite polarity in an amount sufficient to produce a color indication. When these two steps are properly carried out, then any discontinuities in the test body which may cause a deviation in current density into the surface will be revealed by variations in color response. These color or fluorescence variations may be viewed by an observer or inspector as indicated by the "eye" 25.

With regard to apparatus necessary for carrying out the method of this invention, I have found that a simple tray or tank may be used to contain the electrically responsive color-forming liquid. Test parts are immersed in the liquid contained in the tank or tray so that the surface of the part to be inspected is about an inch below the liquid surface. The test body is supported on pins or rods which are connected to a source of electrical voltage, and the electrode of opposite polarity, in the form of a grid of fine wires, is positioned just under the liquid surface and above the test body.

The wire grid electrode may be mounted on a transparent panel such as a sheet of clear plastic or glass. The grid wires may be extremely fine, a suitable material being nickel wires about .003" in diameter, and spaced about .1" apart. The grid electrode is, therefore, essentially transparent, while its configuration is such that it delivers a uniform current field into the test body.

The tray or tank arrangement described above is suitable for testing relatively small parts. Where it is desired to test a large surface, or a surface having a vertical orientation, it is possible to arrange a fixture in the form of a five-sided box with a transparent bottom (with a wire grid) and rubber gasketed edges. This box can be clamped against the test surface and then filled with the electrically responsive color-forming liquid, after which the method of the invention can be carried out to completion. After completion of the inspection for discontinuities, the liquid may be drained from the box into a reservoir.

Various modifications in equipment necessary for the practice of the invention may be employed. For example, a rheostat current control 24 may be inserted in series with the switch 6 in FIG. 1. This rheostat may be adjusted so as to provide a satisfactory rate at which the color zone forms when the switch 6 is closed. For most purposes, a voltage of between 3 to 10 volts, and a current pulse (switch closure) of about 1 to 5 seconds will provide good color zone formation. Excessive voltage or current pulse duration may cause an excessively dense color zone, or may form gas bubbles which will tend to mask or destroy fine indications. The use of a rheostat to limit current input to the test surface may be found desirable; however, the value of resistance of this rheostat control will depend on the electrical conductivity of the electrically responsive color-forming liquid and the size of the test surface which is being inspected, or which is exposed to a color-forming electrical current.

Other modifications may include use of an electroformed screen as the "transparent" electrode in place of the wire grid described above.

Still another modification may include the use of an electrically responsive color-forming liquid which has a semi-viscous consistency of a jelly, and which is applied to the test surface in a thin layer. The transparent electrode may be also in the form of a jelly which is applied as a second separate layer over the first layer of color-forming material. Referring, now to FIG. 2, a test body 30, having a defect in the form of a surface crack at point 31, is shown here in a vertical orientation. A layer of electrically responsive color-forming jelly 32 is applied on the test surface 33, and over this first layer there is applied a transparent layer of electrically conductive jelly 34. Electrical contacts are made with the test body 30 and the electrically conductive jelly layer 34 by means of a contact probe 35 and an electrode plate 36, respectively. A battery 37 is connected to the test setup through a switch 38 and a rheostat 39. When the switch 38 is closed momentarily, a color-forming current flows into the test surface 33 producing a color zone 40. The presence of discontinuity 31 produces a localized variation in current density and a consequent variation in the thickness of the color zone as shown at point 41. The jelly-like layers 32 and 34 are relatively thin and relatively transparent, so that variations in color, as produced on the test surface 33, can be seen readily by visual inspection, as indicated by the "eye" 42, either under white light or under black light, depending on the type of indicator dye which is used in the color-forming material.

Under certain circumstances, it is practical and even desirable to include in the electrically-responsive color-forming jelly material a white pigment material which serves to provide a white background, or some other color which contrasts well with the indications which are formed. A wide variety of usable materials may be employed as color-forming jellies or electrically conductive jellies, one set of formulations being given in the following example:

EXAMPLE NO. 1

An electrically responsive color-forming tracer jelly was prepared as follows:

(A)

Titanium dioxide (ground in glycerin)—5 gm.
Ethoxylated nonylphenol (1.5 mols ethylene oxide per mol of nonylphenol)—25 cc.
Ethoxylated nonylphenol (9 mols ethylene oxide per mol of nonylphenol)—75 cc.

The above A formulation (exclusive of the titanium dioxide pigment) is a gel-forming mixture in accordance with my copending application, Ser. No. 497,058, filed Oct. 18, 1965, now Pat. No. 3,349,041. The titanium dioxide is included simply to provide a white background effect.

(B)

Methanol—200 cc.
Water—100 cc.
Brom cresol purple (Electroflor indicator)—.6 gm.

Parts A and B above were mixed together to form a relatively low viscosity bluish-white mixture which could be applied by spray from conventional spraying equipment. A few drops of sodium hydroxide solution were added to the mixture, along with a few drops of a solution of an ionizable material sufficient to provide a suitable electrical conductivity and to adjust the pH to a point just below that which causes the mixture to turn red.

A test body having surface defects was spray-coated with the above mixture, the spray operation being carried out in such a way that a "dry" spray was applied. By this is meant that the spray nozzle was held relatively far away from the surface being coated so that some evaporation of solvents could be effected from the spray droplets before they impinged on the surface. After the spray coat was applied, it was allowed to stand for a few minutes to permit the methanol to evaporate substantially to completion.

The gel-forming mixture A forms a stiff gel when combined in equal proportions with water. Hence, while the mixture is fluid and of spraying consistency when diluted with methanol, evaporation of the methanol ingredient causes the mixture to revert to a stiff gel. Thus, when applied by spray as described above, the test surface becomes coated with a more-or-less uniform coating of Electroflor indicator in the form of a stiff gel.

A second gel-forming mixture was prepared similar to the above, except that the titanium dioxide was deleted and 15 grams of calcium acetate were substituted for the Brom Cresol Purple. A layer of this clear but electrically conductive mixture was applied over the first coating of electrically responsive color-forming material containing the Brom Cresol Purple. Electrical connections were made as indicated in FIG. 2, and an electrical current was impressed on the test surface. The test surface then showed a color change to red in all areas except where surface defects were present. These regions remained a blue color and showed up clearly as blue spots, lines, or blotches against a red background.

It is, of course, apparent that many variations of the above-described procedure can be devised. For example, the color-forming layer might be applied in an extremely thin film so as to not obscure any submicroscopic defects. A second gel-like layer can then be applied to a thickness on the order of 8 or 10 mils, this second layer being of the same chemical character as the first layer, except that both the titanium dioxide pigment and the Brom Cresol Purple are omitted. Finally, a third electrically conducting layer, could be applied, as described above, and the appropriate electrical contacts might then be made. This modification of the process permits the formation of defect indications with a minimum of obscuring background color.

In the foregoing example, calcium acetate was selected as an ingredient to provide electrical conductivity in the conductive layer, as indicated by layer 34 in FIG. 2, for the reason that this material contains no chlorine or sulfur, which materials are often considered undesirable for use in contact with certain metals, such as nickel alloys or titanium, since they tend to induce intergranular corrosion effects. It is, of course, obvious that many other ionizable compounds could be used in place of the calcium acetate, and various other indicator materials could be used in place of the Brom Cresol Purple. Likewise, other gel-forming mixtures could be used, and the example given is only representative of many possible compositions which would provide the same result.

In carrying out the method of this invention, it is important that care be taken to clean parts or surfaces which are to be treated. This is to remove any surface contaminants which may interfere with the formation of indications of surface or sub-surface discontinuities, and to avoid the transfer of objectionable contaminants into the electrically responsive color-forming liquid. Also, it is desirable to arrange inspection windows over trays or tanks in such a way that there is a minimum amount of liquid surface exposed to the air. This will minimize the deterioration of sensitive color-forming liquids by adsorption of carbon dioxide or other contaminants from the air. In the case where gel-like layers of color-forming material are employed, these are discarded after use by flushing with a suitable solvent, such as water in the case of the materials described in the above example. Such considerations are important but are not essential for the practice of the method of the invention.

Although the invention has been described with reference to particular embodiments thereof, it will be understood that various changes may be made therein without departing from the spirit of the invention or the scope of the appended claims.

I claim:

1. In a nondestructive testing process for detection of defects in electrically conductive test parts, employing said test parts as electrodes of one polarity, employing an electrically responsive color-forming liquid in contact with said test parts, employing an electrically conductive liquid as an electrode of opposite polarity, and passing an electric current between said electrodes sufficient to produce a color indication on the surfaces of said test parts, the improvement wherein said color-forming liquid is in the form of a stiff gel applied as a layer on said test parts, and said electrically conductive liquid is in the form of a stiff gel applied as a layer over said layer of color-forming liquid, wherein any defects in said test parts are indicated.

2. A process in accordance with claim 1 in which the said electrically responsive color-forming liquid is a fluorescent color-forming liquid.

3. A process in accordance with claim 1 in which the said electrically responsive color-forming liquid is a visible color color-forming liquid.

4. A process in accordance with claim 1 in which a third layer of liquid is interposed between the said electrically responsive color-forming liquid layer and the said electrically conductive liquid layer, said third layer being chemically similar to the said electrically responsive layer except that it contains no color-former ingredient.

5. A process in accordance with claim 4 in which said third layer is in the form of a stiff gel.

References Cited

UNITED STATES PATENTS

| | | | |
|---|---|---|---|
| 2,128,228 | 8/1938 | Betz et al. | 73—15 XR |
| 3,020,745 | 2/1962 | Sielicki | 73—104 XR |
| 3,282,805 | 11/1966 | Brown | 204—195 XR |
| 3,366,554 | 1/1968 | Lindblad | 204—1 |
| 3,384,556 | 5/1968 | Rhodes | 204—1 |
| 2,287,122 | 6/1942 | Norris | 204—12 |
| 3,141,837 | 7/1964 | Edelman | 204—43 |
| 3,123,806 | 3/1964 | Alburger | 340—173 |
| 3,419,479 | 12/1968 | Klein | 204—1 |

GERALD L. KAPLAN, Primary Examiner

U.S. Cl. X.R.

204—195; 324—29, 52, 94